United States Patent
Schneider (10) Patent No.: US 6,304,400 B1
(45) Date of Patent: Oct. 16, 2001

(54) SIGNAL DROPOUT COMPENSATION (75) Inventor: Richard C. Schneider, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/264,840

(22) Filed: Mar. 8, 1999

(51) Int. Cl.⁷ .............................. G11B 5/035; G11B 5/09; C11B 27/36
(52) U.S. Cl. ................................. 360/65; 360/46; 360/31; 375/232
(58) Field of Search ................................... 360/65, 46, 53, 360/31; 375/230, 232, 233

(56) References Cited

U.S. PATENT DOCUMENTS

| | | |
|---|---|---|
| 4,364,119 | 12/1982 | Gibson . |
| 4,635,142 | 1/1987 | Haugland . |
| 4,760,470 | 7/1988 | Wagner et al. . |
| 4,843,457 | 6/1989 | Yamagata . |
| 5,126,853 | 6/1992 | Mashimo et al. . |
| 5,132,988 | 7/1992 | Fisher et al. . |
| 5,179,453 | 1/1993 | Tozaki . |
| 5,270,874 | 12/1993 | Seger . |
| 5,317,414 | 5/1994 | Shindo et al. . |
| 5,384,790 | 1/1995 | Tollum . |
| 5,430,661 | 7/1995 | Fisher et al. . |
| 5,469,306 | 11/1995 | Hara . |
| 5,487,085 | * 1/1996 | Wong-Lam et al. .................... 360/65 |
| 5,606,426 | 2/1997 | Kobayashi et al. . |
| 5,666,458 | 9/1997 | Moon et al. . |
| 5,999,349 | * 12/1999 | Choi ........................................ 360/65 |
| 6,078,614 | * 6/2000 | Brown et al. ......................... 375/232 |

* cited by examiner

Primary Examiner—Nabil Hindi
Assistant Examiner—Regina Y Neal
(74) Attorney, Agent, or Firm—Brooks & Kushman P.C.

(57) ABSTRACT

Dropout produces amplitude and high frequency loss in the read signal produced by reading a magnetic tape. A system for dropout compensation includes an adaptive filter that filters the read signal using multiplicative weighting factors based on an error signal. A detector receives the adaptive filter output and produces a binary signal indicating data written onto the magnetic tape. A shaping filter receives the binary signal and produces an ideal read signal representing the read signal resulting from writing and subsequently reading the binary signal without dropout. A differencer determines the error signal by subtracting the adaptive filter output from the ideal read signal.

19 Claims, 5 Drawing Sheets

SIGNAL DROPOUT COMPENSATION

TECHNICAL FIELD

The present invention relates to compensating for dropout in signals read from digital magnetic tape.

BACKGROUND ART

Magnetic tape is effectively used to store digital data. Data is written onto the magnetic tape by a write head. The write head converts a current signal containing the digital information into flux patterns which are written as field transitions onto the magnetic tape. The data is retrieved when the magnetic tape is passed by a read head. The read head output may be amplified and equalized before a detector extracts a binary signal containing the data from the read signal. Magnetic tape storage may be modeled as a magnetic recording channel including the effects of converting a binary signal into magnetic tape field transitions and producing a read signal by sensing the field transitions.

One problem with magnetic tape is dropout or the decrease in the read signal amplitude envelope. Dropout is frequently caused by defects in the magnetic tape. These defects may weaken magnetic field transitions on the tape. Defects may also increase the distance between the magnetic tape and read and write heads. In addition to a decrease in the read signal amplitude envelope, a reduction in high frequency components due to dropout changes the shape of pulses in the read signal making correct detection of data more difficult.

Many designs have been proposed to deal with read signal dropout. For magnetic tape holding analog signals such as voice and video, information lost due to dropout may be replaced with substitute information. The substitute information may be obtained from other channels, may be found by averaging information prior to or following the dropout, or may be artificially generated. Provided the dropout duration is not excessive, human perception will not detect that substitute information has been provided. Substitution techniques will not work with recorded digital data, however, since each bit must be either correctly received or reconstructed using error correction schemes.

Other designs for dropout include circuitry to detect when a dropout is occurring. The output of such dropout detection circuitry is a binary signal that may be used to change filter characteristics or to signify that an error has occurred. Dropout detection circuitry may be complex and the resulting filter modification may not occur rapidly enough to prevent data loss.

Another design uses an adaptive filter preceding the detector. Filter parameters are calculated using an error signal based directly on the detector output. Detection is accomplished using the decision feedback equalization method which may result in infinite error propagation.

What is needed is signal dropout compensation that can continuously and adaptively adjust to both the decreasing amplitude and high frequency attenuation occurring during dropout. Dropout compensation should not require complex dropout detection circuitry. For increased effectiveness and applicability to a wide range of tape systems, dropout compensation should be based on magnetic recording channel properties.

DISCLOSURE OF INVENTION

It is an object of the present invention to provide adaptive dropout compensation.

Another object of the present invention is to provide dropout compensation based on an ideal magnetic recording channel response.

Still another object of the present invention is to provide dropout compensation that continuously and adaptively adjusts to both the decreasing amplitude and high frequency attenuation occurring during dropout.

Yet another object of the present invention is to provide continuous dropout compensation without the need for dropout detection circuitry.

In carrying out the above objects and other objects and features of the present invention, a system is provided for dropout compensation. The system includes an adaptive filter receiving an actual read signal sensed from digital magnetic tape. The adaptive filter produces an output based on the actual read signal and multiplicative weighting factors, each weighting factor based on an error signal. A detector receives the adaptive filter output and generates a binary signal indicating data written onto the magnetic tape. A shaping filter receives the binary signal and produces an ideal read signal representing a signal that would result from writing the binary signal to a magnetic tape without dropout. A differencer determines the error signal as the difference between the ideal read signal and the adaptive filter output.

In an embodiment of the present invention, multiplicative weighting factors are further based on the actual read signal. The multiplicative weighting factors may be adaptively modified to minimize the difference between the actual read signal and the ideal read signal.

In still another embodiment of the present invention, the adaptive filter output includes the sum of product terms. Each product term is the product of one weighting factor and a sample of the actual read signal.

In still another embodiment of the present invention, the shaping filter implements the step response of a magnetic recording channel. The magnetic recording channel includes components for writing data on the magnetic tape and for reading the magnetic tape to produce the actual read signal. The shaping filter may be a finite impulse response filter.

A magnetic read system is also provided. The read system includes read head converting magnetic tape field transitions into a read signal. A read equalizer compensates for distortion in the read signal caused by the read head. An analog-to-digital converter digitizes the compensated read signal. The output of an adaptive filter is based on the digitized read signal and multiplicative weighting factors. Each weighting factor is based on the difference between the adaptive filter output and an ideal read signal obtained from passing the detected adaptive filter output through a shaping filter.

A method is also provided for dropout compensation. The method includes reading a magnetic tape to produce an actual read signal. Weighting factors are determined based on an error signal. The actual read signal is adaptively filtered using the weighting factors. The binary signal written on the magnetic tape is detected based on the adaptively filtered actual read signal. An ideal read signal is generated from the detected binary signal. The error signal is determined as the difference between the ideal read signal and the adaptively filtered actual read signal.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
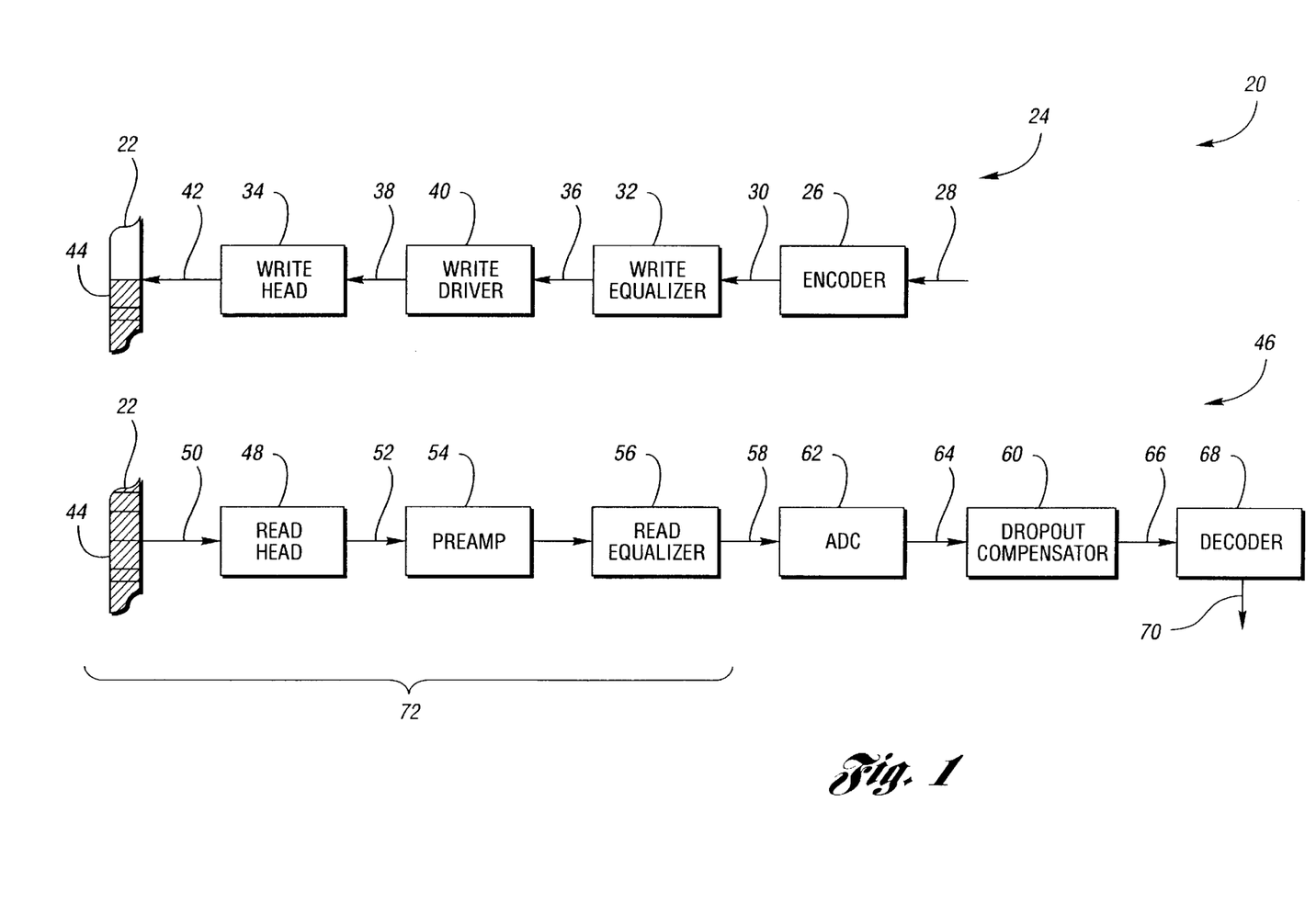
FIG. 1 is a block diagram of a tape system incorporating an embodiment of the present invention.

Referring now to FIG. 1, a block diagram of a tape system incorporating an embodiment of the present invention is shown. A tape system, shown generally by 20, writes data to and reads data from magnetic tape 22. A write system, shown generally by 24, includes encoder 26 accepting data stream 28. Encoder 26 may divide data stream 28 into multiple parallel data streams for simultaneous multi-track recording. Encoder 26 may also encode data stream 28 to achieve a desired range of linear densities. Encoder 26 may further insert bits into data stream 28 for synchronization, signaling, and error correction and detection. The output of encoder 26 is binary signal 30.

Write equalizer 32 filters binary signal 30 to, in part, compensate for write head 34. Equalized binary signal 36 is converted into write current 38 by write driver 40. Write head 34 converts write current 38 into magnetic flux 42 which induces field patterns 44 on magnetic tape 22 as tape 22 moves past write head 34. Write head 34 may contain multiple write elements, each requiring write driver 40 and write equalizer 32 to simultaneously write data tracks onto magnetic tape 22.

Read system 46 includes read head 48 for sensing magnetic flux 50 produced as transitions in field patterns 44 on magnetic tape 22 move past read head 48. Read head output 52 is amplified in preamp 54 and filtered in read equalizer 56 to produce read signal 58. Typically, preamp 54 or read equalizer 56 will contain automatic gain control to compensate for variations in the strength of read head output 52. Read signal 58 may be referred to as the actual read signal to distinguish read signal 58 from an ideal read signal generated within dropout compensator 60. Depending upon the implementation of dropout compensator 60, read signal 58 may be digitized in analog-to-digital converter (ADC) 62 to produce digitized read signal 64. ADC 62 samples once per bit. A typical sampling rate is once every 100 ns. A sample resolution of 6 to 8 bits is sufficient.

Dropout compensator 60 adaptively filters digitized read signal 64 using weighting factors based on an error signal. Dropout compensator 60 detects adaptively filtered read signal 64 to produce binary signal 66. Binary signal 66 contains the same information as binary signal 30 but may have a different format. Binary signal 66 is used to generate an ideal read signal. The difference between the ideal read signal and adaptively filtered read signal 64 is the error signal used to determine weighting factors. An embodiment of a system used to implement dropout compensator 60 is described with regard to FIG. 7 below.

Decoder 68 accepts binary signal 66 and produces data stream 70 having the same information as data stream 28 received by write system 24. Decoder 68 removes bits inserted into data stream 28 and performs error detection and correction. If multiple tracks on tape 22 are read simultaneously, multiple copies of read head 48, preamp 54, read equalizer 56, ADC 62, and dropout compensator 60 feed binary signals 66 into decoder 68.

Magnetic recording channel 72 includes components for writing field patterns 44 onto magnetic tape 22 and for producing read signal 58 from magnetic tape 22. In FIG. 1, magnetic recording channel 72 models write equalizer 32, write driver 40, write head 34, magnetic tape 22, read head 48, preamp 54, and read equalizer 56.

Figure 2:
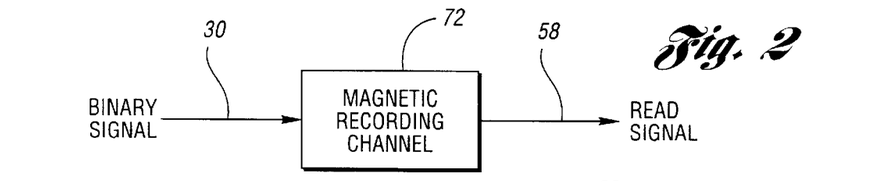
FIG. 2 is a block diagram illustrating a read signal produced by passing a binary signal through a magnetic recording channel.

Referring now to FIG. 2, a block diagram illustrating a read signal produced by passing a binary signal through a magnetic recording channel is shown. Magnetic recording channel 72 may be a linear approximation of components used for writing data onto magnetic tape 22 and for producing read signal 58 by reading magnetic tape 22. Magnetic recording channel 72 generates read signal 58 from binary signal 30 under conditions of no dropout.

Figure 3A:
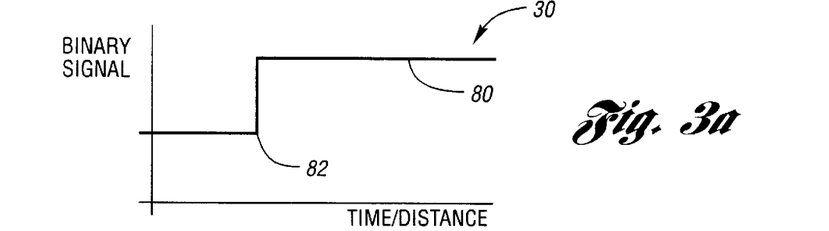
FIG. 3 is a graph illustrating a binary signal step input into a magnetic recording channel at the resulting read signal step response.
Figure 3B:
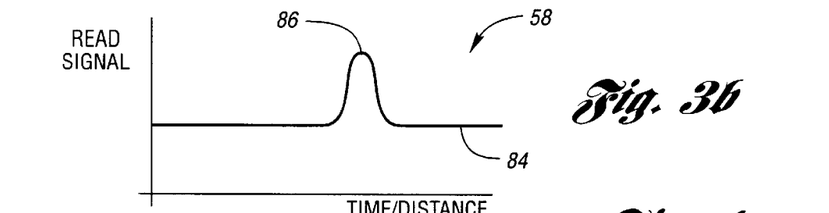

Referring now to FIG. 3, a graph illustrating a binary signal step input into a magnetic recording channel and the resulting read signal step response is shown. Curve 80 has a step input at time 82 for binary signal 30. Response curve 84 includes Gaussian pulse 86 resulting from the step change at time 82 in binary signal 30. The shape and duration of Gaussian pulse 86 depends on the frequency responses of components modeled by magnetic recording channel 72. Because magnetic recording channel 72 includes the effect of tape 22, the independent axis for binary signal 30 and read signal 58 may be expressed as time or as distance along tape 22. Also, since an arbitrary amount of time may pass between when field patterns 44 are written onto tape 22 by write system 24 and when those same field patterns 44 are read from tape 22 by read system 46, Gaussian pulse 86 is often shown centered at time 82.

Figure 4:
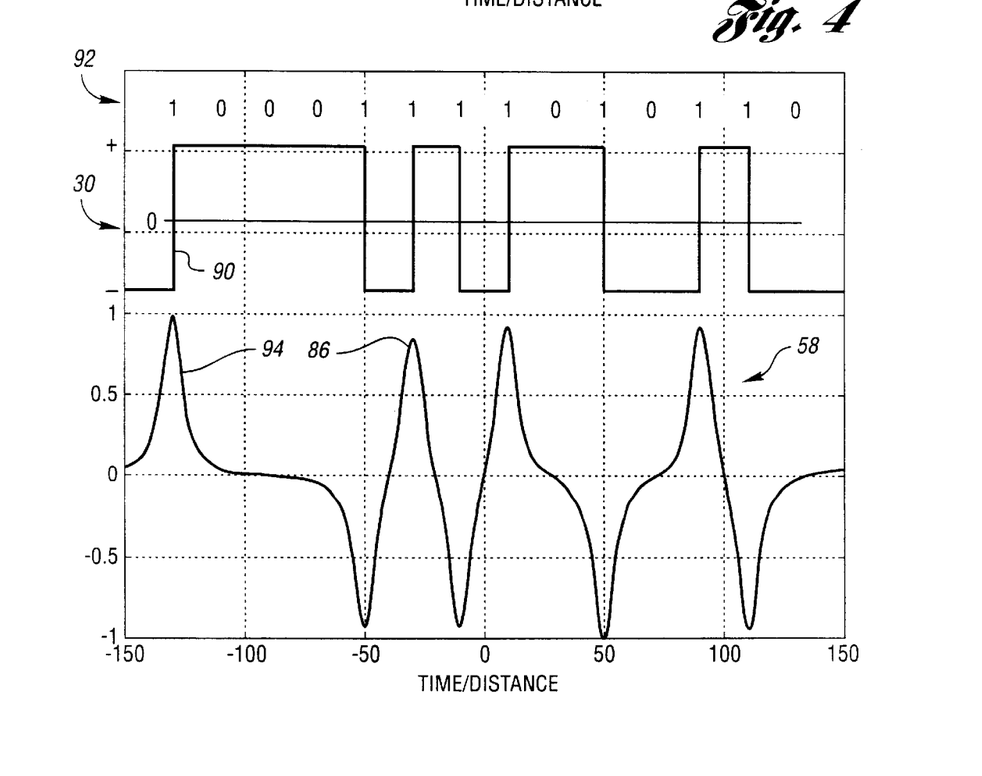
FIG. 4 is a graph read signal pulse smearing resulting from a binary signal input.

Referring now to FIG. 4, a graph illustrating read signal pulse smearing resulting from a binary signal input is shown. Curve 90 represents binary signal 30 resulting from a partial data stream shown generally by 92. Each binary one in partial data stream 92 results in a transition in curve 90 while each binary zero results in no change. Response curve 94 represents read signal 58 produced by passing curve 90 through magnetic recording channel 72. Each transition in binary signal 30 produces a corresponding Gaussian pulse 86. Read signal 58 is the superposition of these Gaussian pulses 86. Most tape read systems contains a detector which samples read signal 58 at the expected peak of each Gaussian pulse 86. If the sampled value exceeds a threshold, typically 40% to 50% of the normalized maximum of Gaussian pulse 86, a binary one is detected. Otherwise, a binary zero is detected. Closely spaced ones in partial data stream 92 produce overlapping Gaussian pulses 86 in read signal 58. Interference between Gaussian pulses 86 reduces the amplitude and changes the shape of Gaussian pulse 86. The detector may compensate for this effect, known as smearing, by considering a sequence of samples of read signal 58 in making the decision as to whether a particular sample is a one or a zero. These techniques, such as the Extended Partial Response Maximum Likelihood (EPRML), are well known in the art of magnetic tape systems. Channel 72 typically also models the effects of the detecting technique used in tape system 20.

Figure 5:
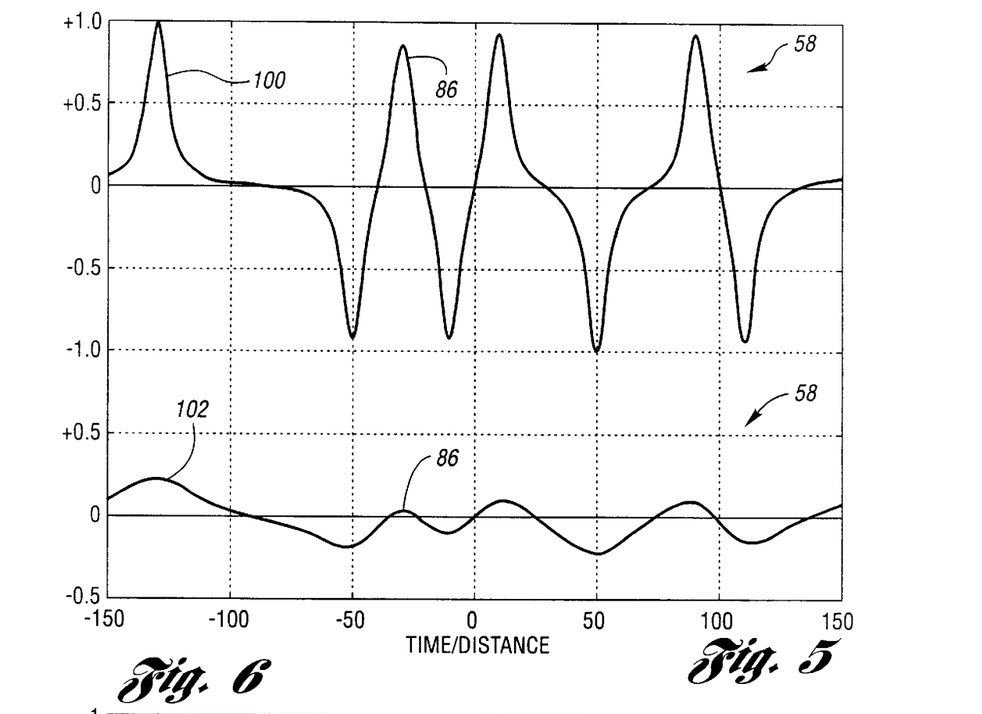
FIG. 5 is a graph depicting read signal dropout.

Referring now to FIG. 5, a graph depicting read signal dropout is shown. Curve 100 illustrates read signal 58 with no dropout. Curve 102 depicts the same read signal 58 with 75% dropout. In addition to the loss of amplitude in curve 102 relative to curve 100, high frequency attenuation in curve 102 changes the shape of Gaussian pulse 86. In particular, each Gaussian pulse 86 has spread in duration, increasing the effects of smearing.

Figure 6:
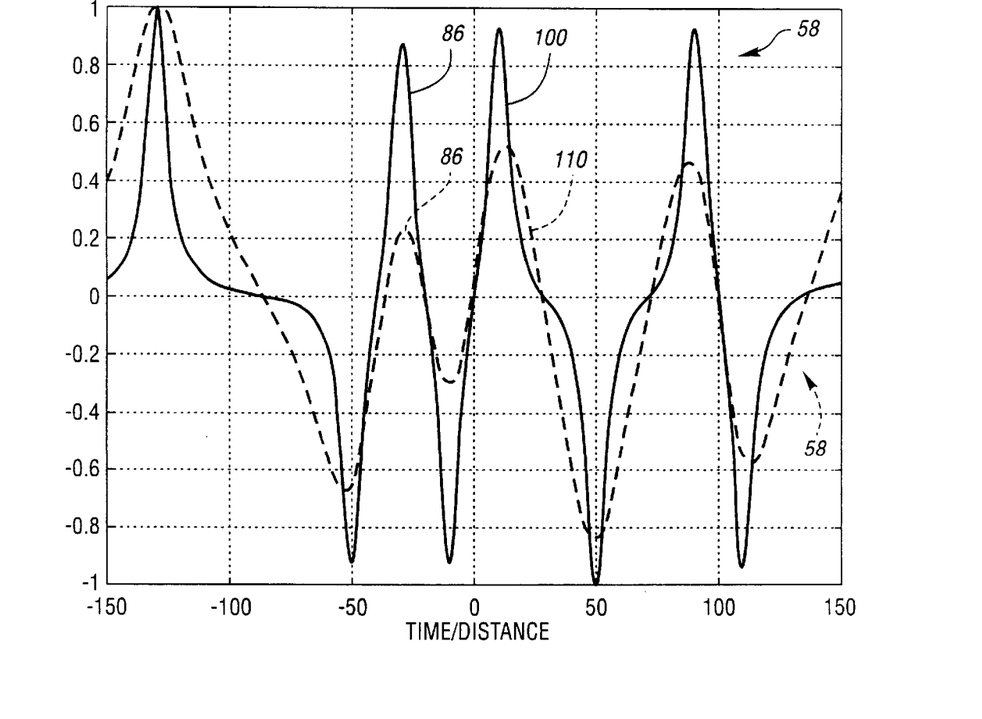
FIG. 6 is a graph depicting read signal dropout with gain correction.

Referring now to FIG. 6, a graph depicting read signal dropout with gain correction is shown. Curve 110 indicates read signal 58 with dropout normalized such that the maximum peak in curve 110 has the same value as the maximum peak in curve 100. Normalization may be accomplished through automatic gain control in preamp 54 or read equalizer 56. Closely spaced Gaussian pulses 86 in normalized dropout curve 110 still do not cross the 40% threshold.

Therefore, gain correction alone cannot compensate for dropout.

Figure 7:
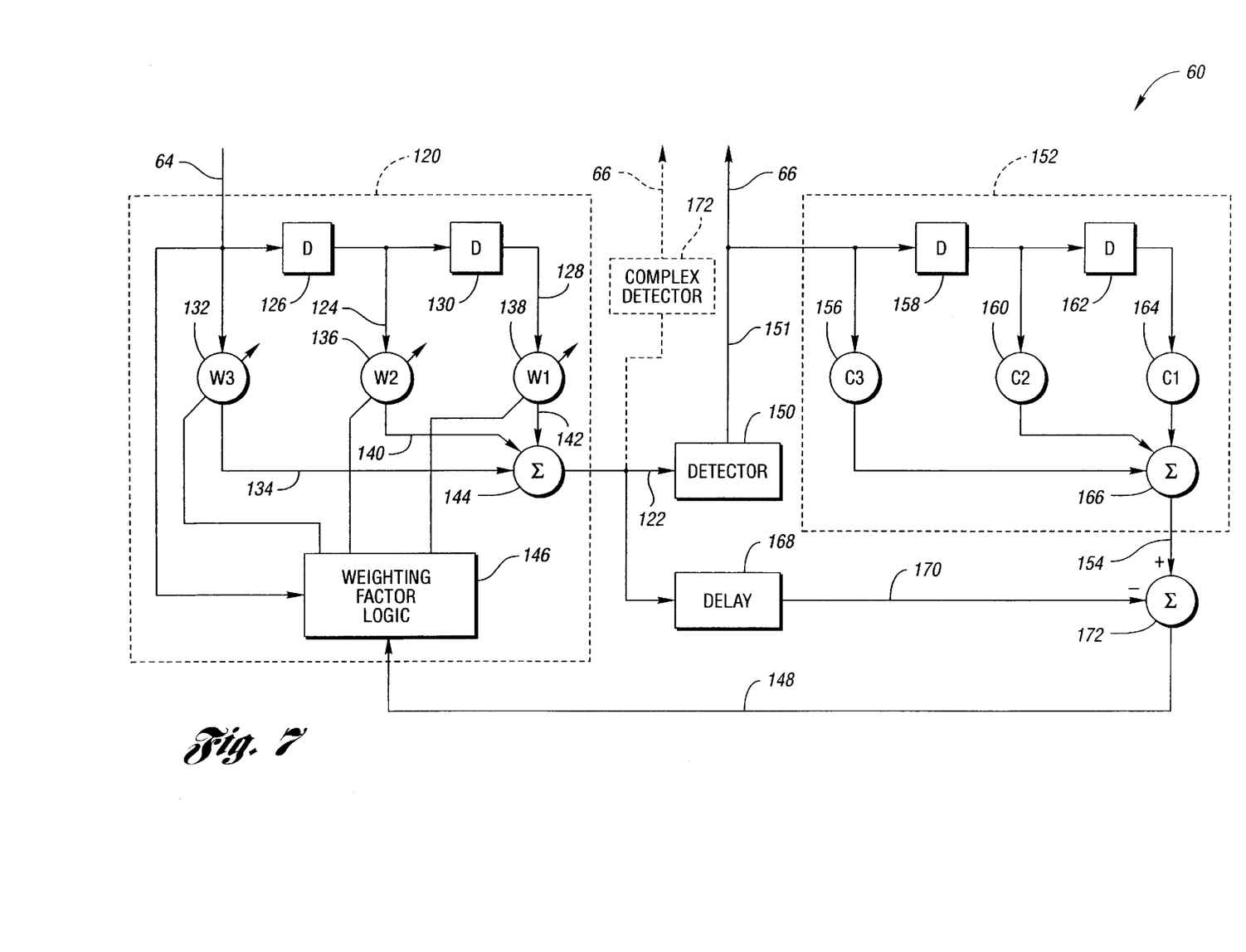
FIG. 7 is a block diagram of a dropout compensator according to an embodiment of the present invention.

Referring now to FIG. 7, a block diagram of a dropout compensator according to an embodiment of the present invention is shown. Dropout compensator 60 may be implemented as analog electronics, digital electronics, software running on a processor, or any combination. A block diagram form is shown for ease of illustration. The present invention transcends any particular implementation and aspects are shown in block diagram form for ease of illustration. In the preferred embodiment, operations depicted in FIG. 7 are implemented as digital logic implemented in a custom integrated circuit.

Dropout compensator 60 accepts actual read signal 58 or, if analog-to-digital converter 62 is included in read system 46, digitized read signal 64. Dropout compensator 60 produces binary signal 66 containing the same information as binary signal 30 even in the presence of dropout.

In the preferred embodiment, adaptive filter 120 accepts digitized read signal 64 and produces adaptive filter output 122. Previous read signal sample 124 results from passing digitized read signal 64 through delay element 126. Second previous read signal sample 128 results from passing previous read signal sample 124 through delay element 130. The product of digitized read signal 64 and weighting factor W3 is performed in multiplier 132 to produce product term 134. Similarly, previous read signal sample 124 and second previous read signal sample 128 are multiplied by weighting factors W2 and W1, respectively, in multipliers 136 and 138, respectively, to produce product terms 140 and 142, respectively. Product terms 134, 140, and 142 are added together in summer 144 to produce adaptive filter output 122. Multiplicative weighting factors W1, W2, and W3 are determined by weighting factor logic 146 based on error signal 148. In an embodiment of the present invention, weighting factors W1, W2, and W3 are also based on digitized read signal 64. An algorithm that may be used in the implementation of weighting factor logic 146 is described below.

Detector 150 accepts adaptive filter output 122 and produces detector output 151 which is a binary signal representing the digital information read from magnetic tape 22. In an embodiment of the present invention, detector output 151 is used as binary signal 66. In a preferred embodiment, detector output 151 expresses binary ones as alternating values of ±1 and binary zeros as 0. Detector 150 may base each decision on a single value of adaptive filter output 22 or, preferably, may use a technique which examines a short sequence of values of adaptive filter output 122.

Shaping filter 152 accepts detector output 151 and produces ideal read signal 154. Ideal read signal 154 represents the read signal which would result from writing and subsequently reading detector output 151 without dropout. This is accomplished by giving shaping filter 152 the same step response as magnetic recording channel 72. Shaping filter 152 is preferably a finite impulse response (FIR) filter to limit propagation of errors produced by detector 150.

Detector output 151 is scaled by constant C3 in multiplier 156. Detector output 151 delayed by delay element 158 is scaled by constant C2 in multiplier 160. Detector output 151, twice delayed by delay elements 158, 162 is scaled by constant C1 in multiplier 164. The outputs of multipliers 156, 160, and 164 are added together by summer 166 to produce ideal read signal 154.

Delay 168 delays adaptive filter output 122 to produce delayed adaptive filter output 170. Delay 168 compensates for the time required for adaptive filter output 122 to pass through detector 150 and shaping filter 152. Differencer 172 produces error signal 148 by subtracting delayed adaptive filter output 170 from ideal read signal 154.

In a preferred embodiment of the present invention, weighting factor logic 146 adaptively produces multiplicative weighting factors W1, W2, and W3 to minimize the difference between digitized read signal 64 and ideal read signal 154. This difference may be minimized by weighting factor logic 146 implementing Equations 1–3 for weighting factors W1, W2, and W3, respectively.

$$W1(n)=W1(n-1)-2k\cdot\text{error}(n-1)\cdot\text{sig}(n-2) \quad (1)$$

$$W2(n)=W2(n-1)-2k\cdot\text{error}(n-1)\cdot\text{sig}(n-3) \quad (2)$$

$$W3(n)=W3(n-1)-2k\cdot\text{error}(n-1)\cdot\text{sig}(n-4) \quad (3)$$

where n is the present sample time, n−m is m bit periods earlier, error is error signal 148, sig is digitized read signal 64, and k is the scaling factor.

In another preferred embodiment Of the invention, complex detector 172 inputs adaptive filter output 122 and produces binary signal 66. Complex detector 172 may implement a detection scheme, such as EPRML, that examines a long sequence of samples in determining whether a particular sample corresponds to a binary one or a binary zero. Complex detector 172 produces less detection errors than detector 150. However, acquiring the long sequence of samples delays the detection of each bit. This delay increases the response time of compensator 60 to dropout. Hence, even with complex detector 172, the output of detector 150 is used as the input for shaping filter 152. In another embodiment, the output of both detector 150 and complex detector 172 are available to be used as binary signal 66.

The block diagram of FIG. 7 illustrates one of the many embodiments possible within the spirit and scope of the present invention. For example, infinite impulse response (IIR) filters may be used to implement adaptive filter 120 and shaping filter 152. Also, both filters 120,152 are shown as third order filters. It will be recognized by one of ordinary skill in the art that any order filter may be used for filters 120,152.

Figure 8:
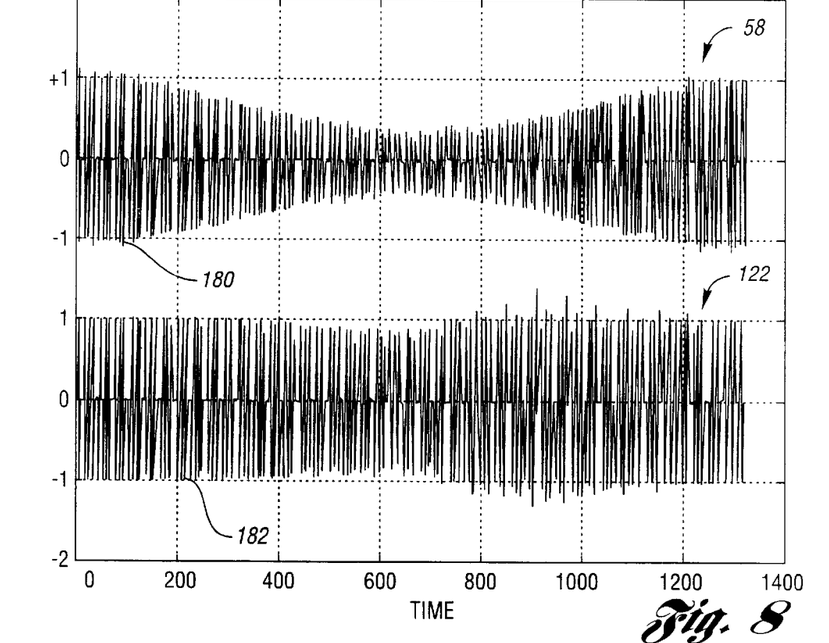
FIG. 8 is a graph illustrating simulation results for the dropout compensator of FIG. 7.

Referring now to FIG. 8, a graph illustrating simulation results for the dropout compensator of FIG. 7 is shown. Curve 180 illustrates read signal 58 experiencing severe dropout. Curve 182 illustrates adaptive filter output 122 compensating for dropout. The simulation producing curve 182 used a scale factor k of 0.4 in adaptive filter 120. Constants C3, C2, and C1 were set to 0.5, 1.0, and 0.5 respectively to reflect the EPRML technique implemented in detector 150.

Figure 9:
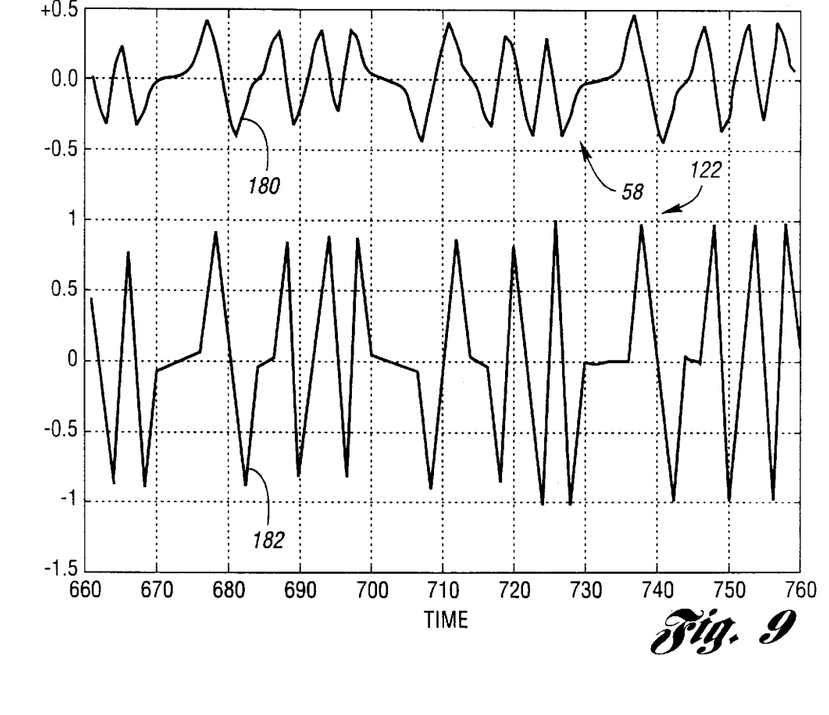
FIG. 9 is a graph illustrating adaptive compensation of a read signal experiencing dropout.

Referring now to FIG. 9, a graph illustrating adaptive compensation of a read signal experiencing dropout is shown. Curve 180 and curve 182 are shown expanded in time during the dropout period. As time progresses, the shape of curve 182 simulating adaptive filter output 122 more closely resembles the shape of curve 180.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A system for dropout compensation of an actual read signal produced by reading digital magnetic tape comprising:

an adaptive filter receiving the actual read signal, the adaptive filter operative to produce an adaptive filter output based on the actual read signal and a plurality of multiplicative weighting factors, each weighting factor based on an error signal and on the actual read signal, the $i^{th}$ multiplicative weighting factor $W_i(n)$ is calculated as $$W_1(n) = W_i(n-1) - 2k \cdot \text{error}(n-1) \cdot \text{sig}(n-1-i)$$

where error( ) is the error signal sig( ) is the actual read signal, k is a constant, and n is a present sample time;

a detector receiving the adaptive filter output, the detector operable to output a binary signal indicating data written onto the magnetic tape;

a shaping filter receiving the binary signal, the shaping filter operative to produce an ideal read signal representing a read signal resulting from writing and subsequently reading the binary signal without dropout; and a differencer in communication with the shaping filter and the adaptive filter, the differencer operative to determine he error signal as the difference between the ideal read signal and the adaptive filter output.

2. A system as in claim 1 wherein the multiplicative weighting factors are adaptively modified to minimize the difference between the actual read signal and the ideal read signal.

3. A system as in claim 1 wherein the adaptive filter output comprises the sum of a plurality of product terms, each product term is the product of one weighting factor and a sample of the actual read signal.

4. A system as in claim 1 wherein the shaping filter implements a magnetic recording channel step response, the magnetic recording channel comprising components for writing data on the magnetic tape and for producing the actual read signal by reading the magnetic tape.

5. A system as in claim 1 wherein the shaping filter is a finite impulse response (FIR) filter.

6. A magnetic tape read system compensating for dropout during reading of field patterns on magnetic tape comprising:

a read head operative to convert the magnetic tape field patterns into a read signal as the magnetic tape moves by the read head;

a read equalizer in communication with the read head operative to compensate for distortion in the read signal;

an analog-to-digital converter in communication with the read equalizer operative to digitize the compensated read signal;

an adaptive filter receiving the digitized read signal, the adaptive filter operative to produce an adaptive filter output based on the digitized read signal and a plurality of multiplicative weighting factors, each weighting factor based on an error signal and on the digitized read signal, the $i^{th}$ multiplicative weighting factor $W_i(n)$ is calculated as $$W_i(n) = W_i(n-1) - 2k \cdot \text{error}(n-1) \cdot \text{sig}(n-1-i)$$

where error( ) is the error signal, sig( ) is the actual read signal, k is a constant, and n is a present sample time;

a detector receiving the adaptive filter output, the detector operable to output a binary signal;

a shaping filter receiving the binary signal, the shaping filter operative to produce an ideal read signal representing a read signal resulting from writing the binary signal to a magnetic tape without dropout; and a differencer in communication with the shaping filter and the adaptive filter, the differencer operative to determine the error signal as the difference between the ideal read signal and the adaptive filter output.

7. A system as in claim 6 wherein the multiplicative weighting factors are farther based on the digitized read signal.

8. A system as in claim 6 wherein the multiplicative weighting factors are adaptively modified to minimize the difference between the digitized read signal and the ideal read signal.

9. A system as in claim 6 wherein the adaptive filter output comprises the sum of a plurality of product terms, each product term is the product of one weighting factor and a sample of the digital read signal.

10. If A system as in claim 6 wherein the shaping filter implements the same step response as a dropout-free magnetic recording channel comprising components for writing the field patterns on the magnetic tape, the read head, and the read equalizer.

11. A system as in claim 6 wherein the shaping filter is a finite impulse response (FIR) filter.

12. A method for dropout compensation comprising:

reading a magnetic tape to produce an actual read signal;

determining weighting factors based on an error signal and based on at least one previous value of the actual read signal, the $i^{th}$ multiplicative weighting factor $W_i(n)$ is calculated as $$W_i(n) = W_i(n-1) - 2k \cdot \text{error}(n31\ 1)\ \text{sig}(n-1-i)$$

where error( ) is the error signal, sig( ) is the actual read signal, k is a constant, and n is a present sample time;

adaptively filtering the actual read signal using the determined weighting factors;

detecting a binary signal written on the magnetic tape based on the adaptively filtered actual read signal;

generating an ideal read signal based on the detected binary signal; and determining the error signal as the difference between the ideal read signal and the adaptively filtered actual read signal.

13. The method of claim 12 wherein determining weighting factors comprises adaptively modifying the weighting factors to minimize the difference between the actual read signal and the ideal read signal.

14. The method of claim 12 wherein adaptively filtering comprises:

computing a plurality of product terms, each product term the product of one weighting factor and a delayed sample of the actual read signal; and summing the plurality of product terms.

15. The method of claim 12 wherein generating an ideal read signal comprises generating a magnetic recording channel step response, the magnetic recording channel comprising components for writing data on the magnetic tape and for producing the actual read signal by reading the magnetic tape.

16. The method of claim 12 wherein generating an ideal read signal comprises generating a finite impulse response.

17. A system for reading digital tape comprising an adaptive filter with a plurality of multiplicative weighting factors, the $i^{th}$ multiplicative weighting factor $W_i(n)$ calculated as $$W_i(n)=W_i(n-1)-2k \cdot \text{error}(n-1) \cdot \text{sig}(n-1-i)$$

where error( ) is an error signal, sig( ) is an actual read signal, k is a constant, and n is a present sample time.

18. A magic tape read system comprising:
   a read head operative to convert magnetic tape field patterns into a read signal as the magnetic tape moves by tie read head;
   a read equalizer in communication with the read head operative to compensate for distortion in the read signal;
   an analog-to-digital converter in communication with the read equalizer operative to digitize the compensated read signal; and
   an adaptive filter receiving the digitized read signal, the adaptive filter producing an adaptive filter output based on the digitized read signal and a plurality of multiplicative weighting factors, the $i^{th}$ multiplicative weighting factor $W_i(n)$ is calculated as $$W_i(n)=W_i(n-1)-2k \cdot \text{error}(n-1) \cdot \text{sig}(n-1-i)$$

where error( ) is an error signal, sig( ) is the digitized read signal, k is a constant, and n is a present sample time.

19. A method of dropout compensation comprising calculating an $i^{th}$ multiplicative weighting factor $W_i(n)$ of an adaptive filter as $$W_i(n)=W_i(n-1)-2k \cdot \text{error}(n-1) \cdot \text{sig}(n-1-i)$$

where error( ) is an error signal based on the difference between an ideal read signal and an adaptively filtered actual read signal, sig( ) is an actual read signal, k is a constant, and n is a present sample time, each multiplicative weighting factor adaptively filtering the actual read signal.

* * * * *